B. H. SILLS.
GRIP TREAD FOR WHEEL TIRES.
APPLICATION FILED FEB. 10, 1914.
1,135,856.
Patented Apr. 13, 1915.
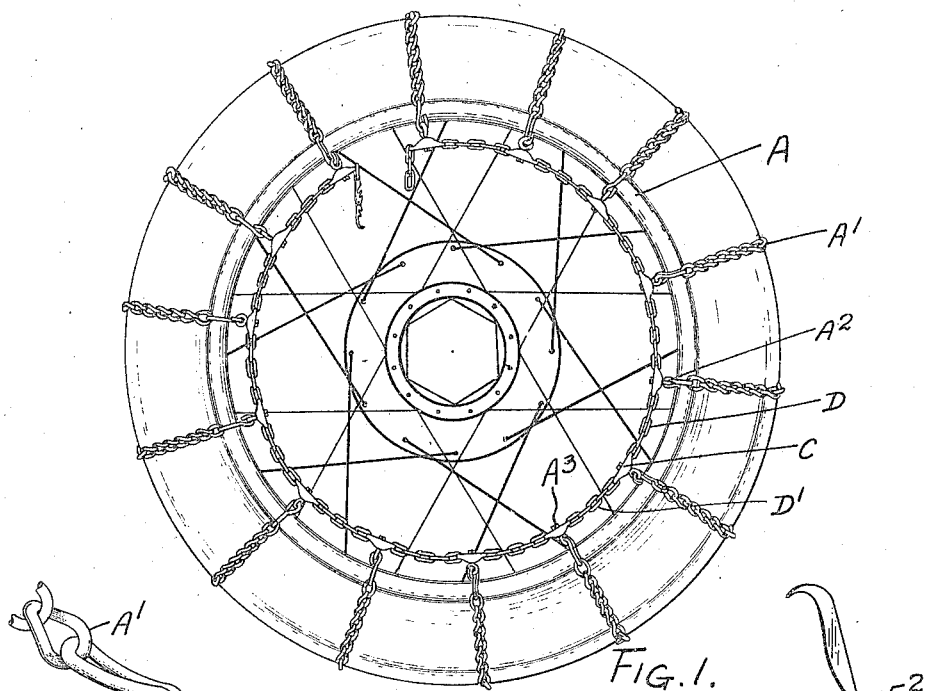
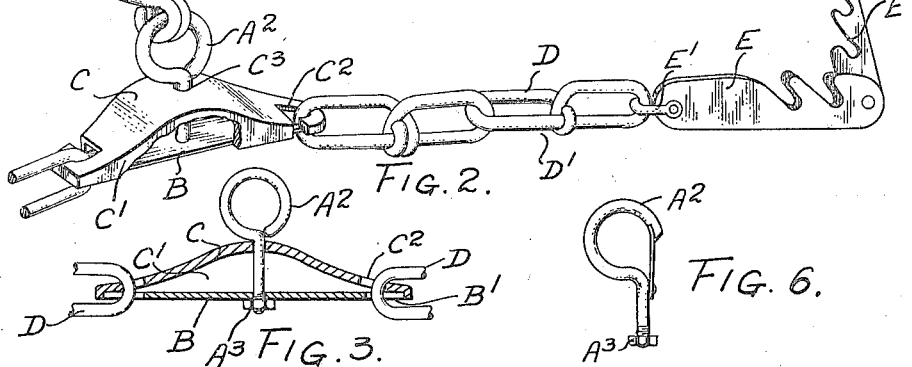
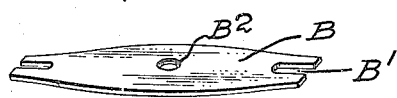
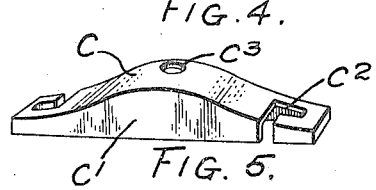
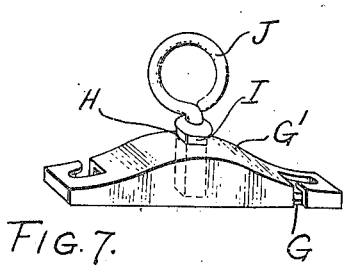
WITNESSES
INVENTOR.
B. H. Sills.

UNITED STATES PATENT OFFICE.

BERTON HERBERT SILLS, OF TORONTO, ONTARIO, CANADA.

GRIP-TREAD FOR WHEEL-TIRES.

1,135,856.  Specification of Letters Patent.  Patented Apr. 13, 1915.

Application filed February 10, 1914. Serial No. 817,831.

*To all whom it may concern:*

Be it known that I, BERTON HERBERT SILLS, of the city of Toronto, in the county of York, in the Province of Ontario, Canada, have invented certain new and useful Improvements in Grip-Treads for Wheel-Tires, of which the following is the specification.

My invention relates to improvements in grip treads for wheel tires, and the object of the invention is to devise an elastic grip tread which may be readily adapted to fit around any size of wheel, the transverse chain thereof being so connected to the annular chains as to have a revolving action and it consists essentially of a series of transverse chains, bolts to which the ends of the transverse chains are connected, annular chains each comprising an annular series of chain sections, connecting means between the adjacent ends of each pair of chain sections, such connecting means forming a resilient journal for supporting the bolts of the transverse chains, and means for connecting the ends of the annular chains together when in place on the tire as hereinafter more particularly explained by the following specification.

Figure 1, is a side elevation of a wheel showing my chain applied thereto. Fig. 2, is a perspective detail of the resilient means connecting the transverse and annular chain sections together and the means for connecting the annular chain ends together. Fig. 3, is a longitudinal section through the chain-section connecting means shown in Fig. 2. Fig. 4, is a perspective detail of the spring plate forming part of the resilient connecting means shown in Fig. 2. Fig. 5, is a perspective detail of the rigid bearing plate for the spring plate. Fig. 6, is a detail of the means for connecting the ends of the transverse chain to the spring means. Fig. 7, is a modification of my construction.

In the drawings like letters of reference indicate corresponding parts in each figure.

A is an automobile wheel to which I have applied my grip tread for the purpose of illustration.

$A'$ are the transverse chains of the grip tread.

$A^2$ are eye bolts to which each end of each transverse chain is connected.

B is a spring plate provided with end longitudinally extending notches $B'$ and a central orifice $B^2$.

C is a rigid plate formed either broad V-shape or arch-shape. The plate C is provided with side ribs $C'$.

$C^2$ are bayonet slots formed in the rigid plate C extending inwardly from the side thereof as shown particularly in Fig. 5.

$C^3$ is a central orifice formed in the plate C and in alinement with the orifice $B^2$ of the plate B when the parts are assembled together. Also when the plates B and C are assembled together the inner end of the longitudinal notch $B'$ overlaps the longitudinal portion of the bayonet slot $C^2$. The stems of the eye bolts $A^2$ extend through the orifices $C^3$ and $B^2$, such stems being preferably threaded and provided with a securing nut $A^3$. By this means a journal bearing is formed for the stem of the eye bolt in the plates C and B.

D are the annular chains which extend around the wheel at each side of the rim and free thereof. The annular chains D comprise a series of chain sections $D'$, the end link of which passes through the alined ends of the slots $B'$ and $C^2$. If it is desired to remove one of the annular sections $D'$ all that is necessary to do is to throw the link sidewise so as to pass through the cross portion of the bayonet slot into position between the plates B and C. The link may then be drawn longitudinally so as to force the spring plate B and plate C apart at the end allowing the link to pass outwardly therebetween.

Although I have shown a nut $B^2$ threaded on to the end of the eye bolt $A^2$ it will, of course, be understood that there are various other ways by which the eye bolt may be secured in position as by a split pin passing through an orifice in the eye bolt or the like. The eye of the eye bolt $A^2$ may also be formed by an open sided eye and spring snap plate for closing the eye opening forming a snap hook to which the transverse chains might be readily connected or disconnected when desired.

In order to connect the annular chains so as to draw the grip tread firmly around the wheel I provide a hook lever E connected to a link at one end of the annular chain at its hooked end by a pivoted strap $E'$, the other end being provided with a hook arrangement $E^2$.

In order to vary the tension of the spring plate B the nut $A^3$ may be threaded on to the stem of the eye bolt against the plate.

In Fig. 7, I have shown a modified form comprising a spring plate G similar to the spring plate B hereinbefore described and a rigid plate G' similar to the plate C hereinbefore described. In this form, however, the plates G and G' are provided with a square hole H through which a square bolt I extends. The bolt I is secured within the plates G and G' by any suitable means such as that shown in connection with the eye bolt A². J is an eye provided with a stem having a swivel connection to the bolt I.

From this description it will be seen that when the grip tread is placed in position around the tire that the spring plates B exert a tension on the transverse chains A' so as to draw them tight against the tire taking up any slack in the chain and thereby insuring of an even traction all around the tire. As above described the grip tread may be quickly adapted to fit any size of wheel by inserting or removing one or more of the annular chain sections D'.

If any undue strain is exerted upon the chain the spring plates B are drawn into an arch position against the rigid plates C between the ribs C', such rigid plate forming a limiting stop for the movement of the spring thereby rendering the chain a solid non-elastic chain when the springs are drawn into this position. Further the transverse chains being connected to the eyebolt as above described allows of such chains revolving as the grip tread creeps around the tire thereby insuring of the transverse chains wearing evenly and preventing the forming of flat portions and sharp edges.

What I claim as my invention is—

1. An anti-slipping device for which wheels comprising a plurality of chain sections on either side of the wheel, arched rigid plates to which the ends of the chain sections are detachably connected to form annular retaining members, flat spring plates bearing at their ends against the ends of the rigid plates, eye-bolts journaled centrally in the rigid and spring plates, and transverse chains connected to said eye-bolts and extending across the tread of the wheels.

2. An anti-slipping device for which wheels comprising a plurality of chain sections on either side of the wheel, arched plates having bayonet slots at either end extending inwardly from the edge thereof and with which the end links of adjacent chain sections engaged to form annular retaining members, spring members bearing at their ends against the ends of the plate for holding said end links in place, eye bolts journaled within the arched plates and spring members and transverse chains connected to the eye-bolts and extending across the tread of the wheel.

3. In a device of the class described, the combination of a series of transverse chains, arched rigid plates provided at either end with bayonet slots extending inwardly from an edge thereof and chain sections the end links of which engage said slots connecting said plates to form retaining members, spring plates having longitudinal notches at their ends extending to each side of the bayonet slots to engage the inserted links, and eye-bolts journaled in the rigid plates and to which the transverse chains are connected.

4. In a device of the class described, the combination of a series of transverse chains, rigid arched plates and chain sections the end links of which are detachably connected thereto to form retaining members, spring plates bearing at their ends against the ends of the arched plates and eye-bolts revolubly journaled in the rigid and spring plates to which the transverse chains are connected.

5. In a device of the class described, the combination with a pair of annular retainers composed of chain sections and of arched rigid plates provided at either ends with bayonet slots in which the end links of adjacent sections engage, spring plates having longitudinal notches at their ends extending to each side of the bayonet slots for holding said end links in place, eye-bolts having threaded ends journaled within the arched and spring plates, transverse chains connected to the eye-bolts and extending across the tread of the wheel, and nuts working on the threaded ends of said eye-bolts and bearing against the face of the spring plates for adjusting the tension thereof.

BERTON HERBERT SILLS.

Witnesses:
M. EGAN,
C. PENNOCK.